United States Patent
Igasaki et al.

(10) Patent No.: US 11,215,739 B2
(45) Date of Patent: Jan. 4, 2022

(54) VARIABLE FOCAL LENGTH LENS APPARATUS AND CONTROL METHOD

(71) Applicant: MITUTOYO CORPORATION, Kanagawa (JP)

(72) Inventors: Shiro Igasaki, Kanagawa (JP); Nobuo Ooba, Kanagawa (JP); Masaki Okayasu, Tokyo (JP); Yuki Kurahashi, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 220 days.

(21) Appl. No.: 16/556,546

(22) Filed: Aug. 30, 2019

(65) Prior Publication Data

US 2020/0073025 A1  Mar. 5, 2020

(30) Foreign Application Priority Data

Aug. 30, 2018 (JP) .............................. JP2018-161172

(51) Int. Cl.
| G02B 3/14 | (2006.01) |
| G02B 3/00 | (2006.01) |
| G02F 1/11 | (2006.01) |
| G02F 1/29 | (2006.01) |

(52) U.S. Cl.
CPC ............ *G02B 3/14* (2013.01); *G02B 3/0081* (2013.01); *G02B 3/0075* (2013.01); *G02F 1/113* (2013.01); *G02F 1/294* (2021.01)

(58) Field of Classification Search
CPC ...... G02B 3/14; G02B 3/0081; G02B 3/0075; G02B 26/004; G02F 1/294; G02F 1/113; G02F 1/29
See application file for complete search history.

(56) References Cited

U.S. PATENT DOCUMENTS

| 2010/0177376 A1 | 7/2010 | Arnold et al. |
| 2013/0218270 A1* | 8/2013 | Blanckaert ............ A61F 2/1627 623/6.17 |
| 2018/0314041 A1 | 11/2018 | Igasaki et al. |

FOREIGN PATENT DOCUMENTS

| JP | H11-23219 A | 1/1999 |
| JP | 2009-122105 A | 6/2009 |
| JP | 2018-189700 A | 11/2018 |

OTHER PUBLICATIONS

U.S. Appl. No. 16/527,486 to Koji Kubo, filed Jul. 31, 2019.
U.S. Appl. No. 16/549,323 to Shiro Igasaki et al., filed Aug. 23, 2019.
U.S. Appl. No. 16/414,148 to Hiroshi Sakai et al., filed May 16, 2019.
U.S. Appl. No. 16/519,117 to Koji Kubo et al., filed Jul. 23, 2019.
U.S. Appl. No. 16/519,359 to Koji Kubo, filed Jul. 23, 2019.

* cited by examiner

*Primary Examiner* — Robert E. Tallman
(74) *Attorney, Agent, or Firm* — Greenblum & Bernstein, P.L.C.

(57) ABSTRACT

A variable focal length lens apparatus includes a liquid lens apparatus in which the refractive index changes in accordance with an input drive signal, and a refractive power controller that controls refractive power of the lens system. The refractive power controller adjusts the voltage of the drive signal in accordance with effective power that is supplied to the liquid lens apparatus.

7 Claims, 16 Drawing Sheets

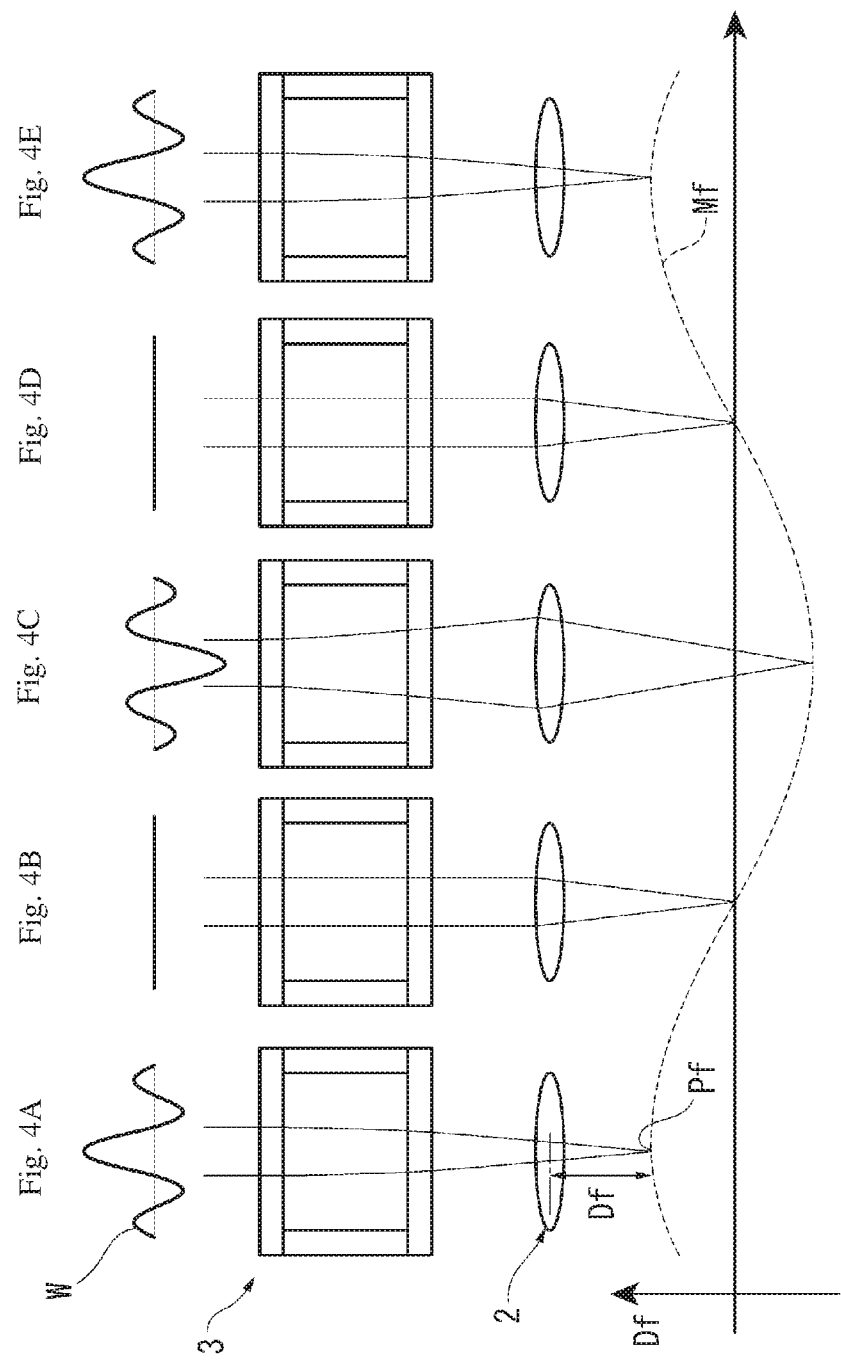

VARIABLE FOCAL LENGTH LENS APPARATUS AND CONTROL METHOD

CROSS-REFERENCE TO RELATED APPLICATIONS

The present application claims priority under 35 U.S.C. § 119 of Japanese Application No. 2018-161172, filed on Aug. 30, 2018, the disclosure of which is expressly incorporated by reference herein in its entirety.

BACKGROUND OF THE INVENTION

1. Field of the Invention

The present invention relates to a variable focal length lens apparatus and a variable focal length lens control method.

2. Description of Related Art

As a variable focal length lens apparatus, an apparatus has been developed that uses a liquid lens system (hereafter referred to simply as "lens system") operating on a principle described by the specification of U.S. Published Patent Application No. 2010/0177376, for example. The liquid lens system is formed by immersing in transparent liquid a hollow cylindrical oscillating member that is formed of a piezoelectric material. In the liquid lens system, when AC voltage is applied to an inner circumferential surface and outer circumferential surface of the oscillating member, the oscillating member expands and contracts in a thickness direction and oscillates the liquid inside the oscillating member. By adjusting a frequency of the applied voltage according to the natural frequency of the liquid, a standing wave of concentric circles is formed in the liquid and concentric circular regions having different refractive indexes are formed centered on a center axis line of the oscillating member. In this state, when light transits along the center axis line of the oscillating member, the light travels along a path that either disperses or converges the light in accordance with the refractive index of each concentric circular region.

The liquid lens system described above and an objective lens for bringing the light into focus (for example, an ordinary convex lens or a group of lenses) are arranged on the same optical axis to configure a variable focal length lens apparatus. The liquid lens system is packaged as a liquid lens apparatus and is incorporated into the variable focal length lens apparatus. When parallel light strikes the ordinary objective lens, light passing through the lens comes into focus at a focal point position that lies at a predetermined focal length. In contrast, when parallel light strikes the lens system arranged coaxially with the field lens, the light is either dispersed or converged by the lens system and the light transiting the objective lens comes into focus at a position offset either farther away or closer than the original (state with no lens system) focal point position. Accordingly, in the variable focal length lens apparatus, a drive signal (AC voltage of a frequency that generates a standing wave in the interior liquid) that is input to the lens system is applied, and by increasing and decreasing the amplitude of the drive signal, the focal position of the variable focal length lens apparatus can be controlled as desired within a set range (a predetermined amount of change over which increase and decrease by the lens system is possible, with the focal length of the objective lens as a reference).

In the variable focal length lens apparatus, a sinusoidal AC signal is used as an exemplary drive signal that is input to the lens system. When such a drive signal is input, the focal length (focal point position) of the variable focal length lens apparatus changes sinusoidally. In this case, when the amplitude of the drive signal is 0, the light transiting the lens system is not refracted and the focal length of the variable focal length lens apparatus is the focal length of the objective lens. When the amplitude of the drive signal is at a positive or negative peak, the light transiting the lens system is maximally refracted and the focal length of the variable focal length lens apparatus is in a state having the greatest change from the focal length of the objective lens. When an image is obtained using a variable focal length lens apparatus of this kind, a light emission signal is output to provide pulse illumination, synchronized with the phase of the sine wave of the drive signal. Accordingly, by providing pulse illumination in a state that is focused at a predetermined focal length, from among the sinusoidally changing focal lengths, the image of the object at the focal length is detected. Pulse illumination is performed at a plurality of phases that make up one period, and when image detection is performed in accordance with each phase, images at a plurality of focal lengths can be obtained simultaneously.

In the variable focal length lens apparatus described above, the temperature of the oscillating member or of the liquid inside the lens system may change due to an influence of outside air temperature, or heat produced in association with operation, or the like. In the lens system, the natural frequency may change due to a change in temperature, and the frequency of the AC signal that achieves the standing waves (resonance frequency) may also fluctuate. When the drive signal input to the lens system is identical to a pre-fluctuation signal, the drive signal becomes offset from a peak in the resonance frequency and a standing wave cannot be achieved efficiently. Given this, use of a resonance lock ability that causes the drive signal to track automatically to such fluctuations in the resonance frequency has been investigated (see, for example, Japanese Patent Application No. 2017-089576).

However, even when a standing wave is achieved in the lens system using a resonance lock ability, a maximum refractive power (peak in the refractive index) of the lens system may fluctuate due to the influence of the change in temperature noted above. The refractive power of the lens system is an optical characteristic, and therefore directly detecting and correcting the refractive power is difficult.

SUMMARY OF THE INVENTION

The present invention provides a variable focal length lens apparatus and variable focal length lens control method that are capable of controlling a maximum refractive power of a lens system.

A variable focal length lens apparatus according to the present invention includes a lens system in which the refractive index changes in accordance with an input drive signal, and a refractive power controller that controls refractive power of the lens system. The refractive power controller adjusts the voltage of the drive signal in accordance with effective power that is supplied to the lens system.

In the present invention, a maximum refractive power of the lens system is correlated to the effective power that is supplied to the lens system. In turn, the effective power that is supplied to the lens system is correlated to the voltage of the drive signal (drive voltage). Given this, in the present invention, a desired effective power can be supplied to the lens system by adjusting the drive voltage in accordance with the present effective power of the lens system. By doing so, the maximum refractive power of the lens system can be controlled to a desired value.

In the variable focal length lens apparatus according to the present invention, the refractive power controller preferably adjusts the drive voltage based on increases and decreases in the effective power relative to a target effective power. According to the present invention, the drive voltage can be adjusted so as to keep the effective power of the lens system at the target effective power. By doing so, the maximum refractive power of the lens system can be stabilized.

The variable focal length lens apparatus according to the present invention preferably further includes a resonance lock controller that detects a drive current supplied to the lens system, the drive voltage, and a voltage-current phase difference, which is a phase difference between the drive current and the drive voltage, and the resonance lock controller causes a frequency of the drive signal to track to a resonance frequency of the lens system based on the drive current or the voltage-current phase difference. The refractive power controller preferably calculates the effective power based on the drive current, the drive voltage, and the voltage-current phase difference acquired from the resonance lock controller. According to the present invention, a stable standing wave can be generated in the lens system while favorably controlling the maximum refractive power of the lens system.

In the variable focal length lens apparatus according to the present invention, the resonance lock controller preferably adjusts the frequency of the drive signal based on increases and decreases in the voltage-current phase difference relative to a target voltage-current phase difference. In the present invention, the resonance lock controller adjusts the frequency of the drive signal such that the voltage-current phase difference stabilizes at the target voltage-current phase difference, and accordingly causes the frequency of the drive signal to track to the resonance frequency of the lens system. The target voltage-current phase difference is a predefined value and may, for example, be lower than a peak value of the voltage-current phase difference. In the present invention, since the resonance lock controller and the refractive power controller have mutually distinct control objects and reference objects, independent control can be performed at timing that is favorable for each.

In the variable focal length lens apparatus according to the present invention, the resonance lock controller preferably adjusts the frequency of the drive signal based on increases and decreases in the drive current relative to a reference drive current, and the resonance lock controller is preferably in a standby state while the refractive power controller increases and decreases the voltage of the drive signal. In the present invention, the resonance lock controller adjusts the frequency of the drive signal such that the drive current stabilizes at the reference drive current, and accordingly causes the frequency of the drive signal to track to the resonance frequency of the lens system. In this example, the reference drive current is a predefined value and may, for example, be a drive current value at a time when the peak value is assigned to the voltage-current phase difference. In the present invention, the drive current of the object being referenced by the resonance lock controller fluctuates due to the refractive power controller increasing and decreasing the drive voltage. Therefore, in the present invention, the resonance lock controller is in the standby state while the refractive power controller increases and decreases the drive voltage, thereby circumventing fluctuation of the reference object during control operations of the resonance lock controller. Accordingly, the influence of the refractive power controller on the resonance lock controller can be decreased.

In the variable focal length lens apparatus according to the present invention, the refractive power controller preferably updates the reference drive current when the voltage of the drive signal has been adjusted. In the present invention, by updating the reference drive current, appropriate control may be performed in the control operations of the resonance lock controller, which references the post-fluctuation drive current.

In a variable focal length lens control method according to the present invention, a variable focal length lens apparatus includes a lens system in which the refractive index changes in accordance with an input drive signal, and a refractive power controller that controls refractive power of the lens system, and the refractive power controller performs a process of adjusting the voltage of the drive signal in accordance with effective power that is supplied to the lens system. According to the present invention, effects similar to those of the variable focal length lens apparatus described above can be achieved.

According to the present invention, a variable focal length lens apparatus and variable focal length lens control method can be provided that are capable of controlling a maximum refractive power of a lens system.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 4A to 4E are schematic views illustrating focal lengths of the liquid lens apparatus according to the first embodiment;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment (Overall Configuration)

Figure 1:
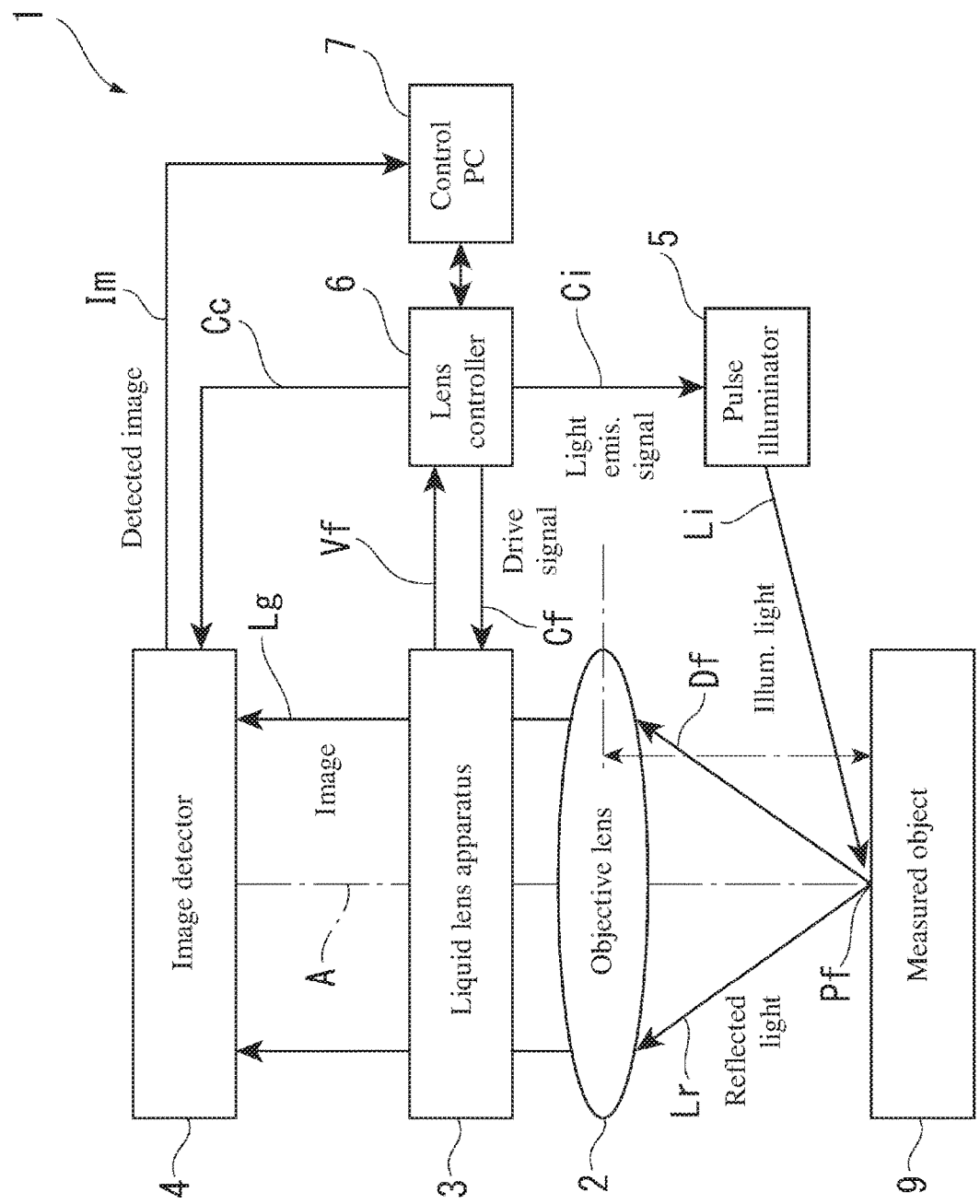
FIG. 1 is a schematic view illustrating a first embodiment of the present invention.

In FIG. 1, a variable focal length lens apparatus 1 detects an image of a surface of a measured object 9 while varying a focal length Df. In order to do this, the variable focal length lens apparatus 1 is provided with an objective lens 2 and a liquid lens apparatus 3 that are arranged on the same optical axis A that intersects with the surface; an image detector 4 that detects an image of the measured object 9, which is obtained through the objective lens 2 and the liquid lens apparatus 3; and a pulse illuminator 5 that provides pulse illumination of the surface of the measured object 9. In the variable focal length lens apparatus 1, a variable focal length lens is configured by the objective lens 2 and the liquid lens apparatus 3.

Moreover, the variable focal length lens apparatus 1 is provided with a lens controller 6 that controls operation of the liquid lens apparatus 3 and the pulse illuminator 5, and a control PC 7 for operating the lens controller 6. The control PC 7 is configured by a known personal computer and achieves expected functionality by running predetermined control software. The control PC 7 also includes the ability to import and process images from the image detector 4.

The objective lens 2 is configured by a known convex lens. The image detector 4 is configured by a known charge coupled device (CCD) image sensor or some other form of camera or the like, and can output to the control PC 7 an incident image Lg as a detected image Im having a predetermined signal form. The pulse illuminator 5 is configured by a light emitting element such as a light emitting diode (LED), and when a light emission signal Ci is input from the lens controller 6, illumination light Li can be emitted for a predetermined amount of time and pulse illumination of the surface of the measured object 9 can be provided. The illumination light Li is reflected by the surface of the measured object 9, and reflected light Lr from the surface of the measured object 9 passes through the objective lens 2 and the liquid lens apparatus 3 to create the image Lg.

The liquid lens apparatus 3 configures, on an interior thereof, a lens system according to the present invention, and a refractive index of the liquid lens apparatus 3 changes in response to a drive signal Cf input from the lens controller 6. The drive signal Cf is a sinusoidal AC signal of a frequency that generates a standing wave in the liquid lens apparatus 3. In the variable focal length lens apparatus 1, a focal length Df to a focal position Pf can be changed as desired by changing the refractive index of the liquid lens apparatus 3 with the focal length of the objective lens 2 as a reference.

(Liquid Lens Apparatus 3)

Figure 2:
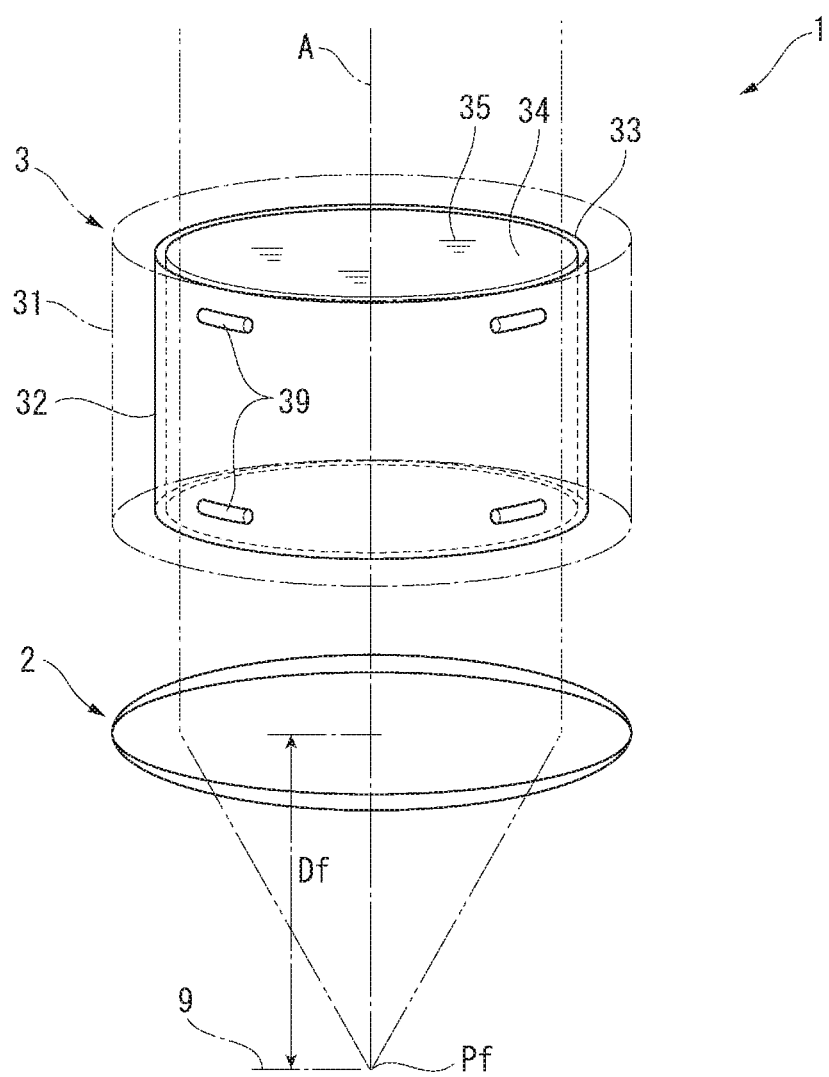
FIG. 2 is a schematic view illustrating a configuration of a liquid lens apparatus according to the first embodiment.

In FIG. 2, the liquid lens apparatus 3 includes a hollow cylindrical case 31, and a hollow cylindrical oscillating member 32 is installed on an interior of the case 31. The oscillating member 32 is supported by spacers 39 made of an elastomer that are disposed between an outer circumferential surface 33 of the oscillating member 32 and an inner circumferential surface of the case 31. The oscillating member 32 is a member where a piezoelectric material is formed in a hollow cylindrical shape. The oscillating member 32 oscillates in a thickness direction due to an AC voltage of the drive signal Cf being applied between the outer circumferential surface 33 and the inner circumferential surface 34. The interior of the case 31 is filled with a highly transparent liquid 35, the entire oscillating member 32 is immersed in the liquid 35, and an inner side of the hollow cylindrical oscillating member 32 is filled with the liquid 35. The AC voltage of the drive signal Cf is adjusted to a frequency that generates a standing wave in the liquid 35 on the inner side of the oscillating member 32.

Figures 3A, 3B, 3C:
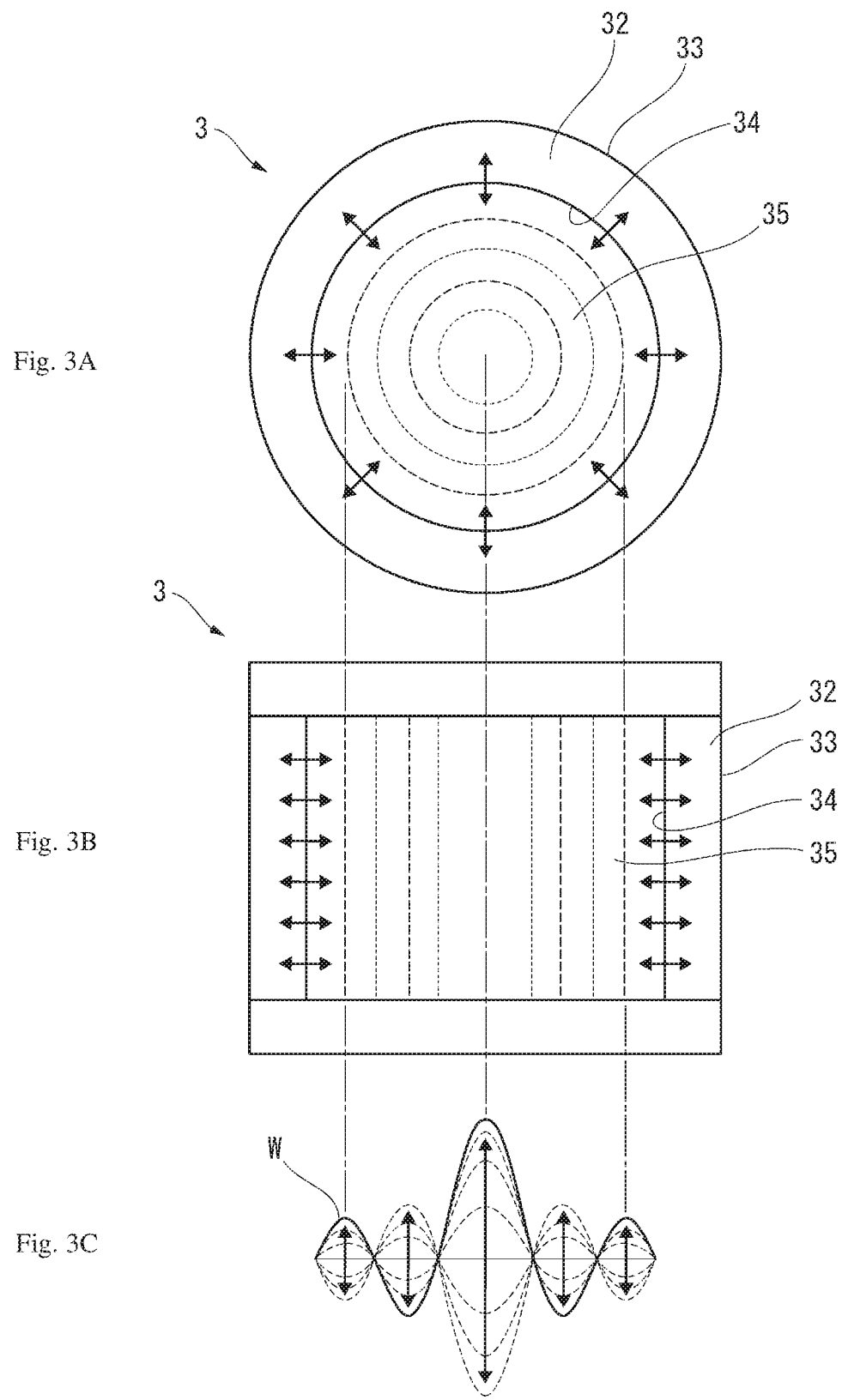
FIGS. 3A to 3C are schematic views illustrating oscillation states of the liquid lens apparatus according to the first embodiment.

As shown in FIGS. 3A to 3C, in the liquid lens apparatus 3, when the oscillating member 32 is oscillated, a standing wave arises in the interior liquid 35 and concentric circular regions arise in which the refractive index alternates (see FIGS. 3A and 3B). At this point, a relationship between a distance from a center axis line of the liquid lens apparatus 3 (radius) and the refractive index of the liquid 35 is as shown by a refractive index distribution W illustrated in FIG. 3C.

In FIGS. 4A to 4E, because the drive signal Cf is a sinusoidal AC signal, bands in the refractive index distribution W of the liquid 35 in the liquid lens apparatus 3 also change in accordance with the drive signal Cf. Also, the refractive index of the concentric circular regions that arise in the liquid 35 changes sinusoidally, and accordingly the focal length Df to the focal position Pf changes sinusoidally. In the state depicted in FIG. 4A, an amplitude of the refractive index distribution W is at its largest, the liquid lens apparatus 3 causes transiting light to converge, the focal position Pf is closer, and the focal length Df is at its shortest. In the state depicted in FIG. 4B, the refractive index distribution W is flat, the liquid lens apparatus 3 allows transiting light to transit unaffected, and the focal position Pf and the focal length Df are at standard values. In the state depicted in FIG. 4C, the amplitude of the refractive index distribution W is at its largest at the opposite pole from that of FIG. 4A, the liquid lens apparatus 3 causes transiting light to scatter, the focal position Pf is farther, and the focal length Df is at its maximum. In the state depicted in FIG. 4D, once again the refractive index distribution W is flat, the liquid lens apparatus 3 allows transiting light to transit unaffected, and the focal position Pf and the focal length Df are at standard values. The state depicted in FIG. 4E returns once again to the state depicted in FIG. 4A and similar fluctuations are repeated thereafter.

In this way, in the variable focal length lens apparatus 1, the drive signal Cf is a sinusoidal AC signal, and the focal position Pf and the focal length Df also fluctuate sinusoidally, as in a focal point fluctuation waveform Mf in FIGS. 4A to 4E. At this time, pulse illumination is provided to the measured object 9 located at the focal position Pf at a desired point in time on the focal point fluctuation waveform Mf, and when an image illuminated at that point in time is detected, an image is obtained of the focal position Pf at the focal length Df at the desired time of illumination.

(Lens Controller and Control PC)

Figure 5:
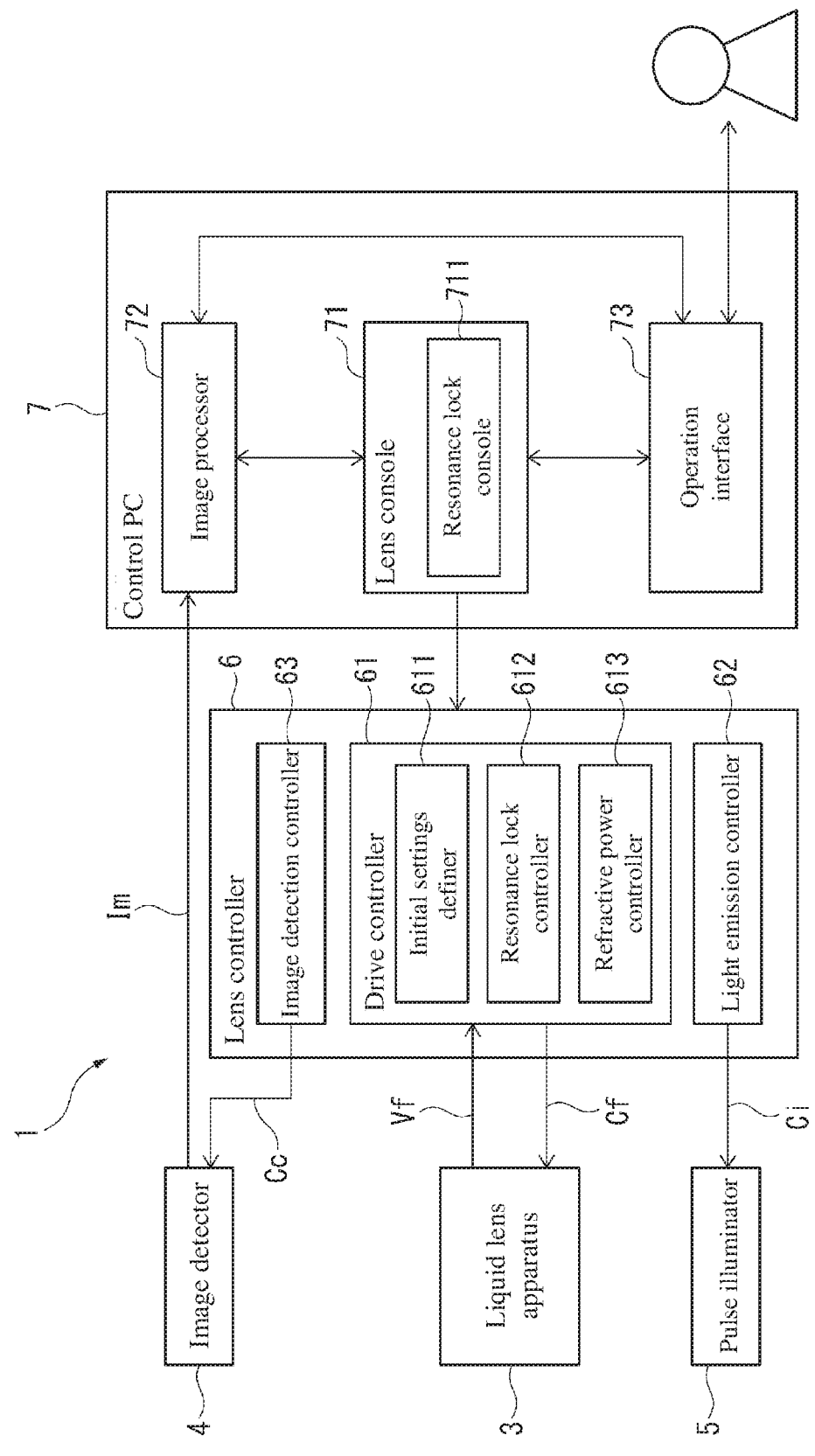
FIG. 5 is a block diagram illustrating a lens controller and a control PC according to the first embodiment.

As illustrated in FIG. 5, in the variable focal length lens apparatus 1, oscillation of the liquid lens apparatus 3, light emission of the pulse illuminator 5, and image detection of the image detector 4 are respectively controlled by the drive signal Cf, the light emission signal Ci, and an image detection signal Cc from the lens controller 6. The lens controller 6 includes a drive controller 61 that outputs the drive signal Cf to the liquid lens apparatus 3, a light emission controller 62 that outputs the light emission signal Ci to the pulse illuminator 5, and an image detection controller 63 that outputs the image detection signal Cc to the image detector 4.

The drive controller 61 includes an initial settings definer 611, a resonance lock controller 612, and a refractive power controller 613. The initial settings definer 611 defines the initial setting for each of a target voltage-current phase difference ht and a target effective power pt. When the lens system 3 oscillates based on the input drive signal Cf, the resonance lock controller 612 detects a voltage-current phase difference Rh of the drive signal Cf, which is an indicator of an oscillation state Vf of the lens system 3. Then, the frequency of the drive signal Cf (drive frequency) is adjusted based on the voltage-current phase difference Rh of the drive signal Cf that is applied to the liquid lens apparatus 3, and the drive frequency is locked to the present resonance frequency of the liquid lens apparatus 3. For details on the resonance lock controller 612, see Japanese Patent Application No. 2017-089576.

When the liquid lens apparatus 3 operates based on the drive signal Cf, the refractive power controller 613 adjusts the voltage of the drive signal Cf (drive voltage) based on an effective power Rp that is applied to the liquid lens apparatus 3, and controls the maximum refractive power of the liquid lens apparatus 3. Also, from the resonance lock controller 612, the refractive power controller 613 acquires reference values for performing control, such as the drive voltage, a drive current Ri, and the voltage-current phase difference Rh.

Various gauges detecting the drive voltage and drive current Ri supplied to the liquid lens apparatus 3 are provided between the drive controller 61 and the liquid lens apparatus 3, and each detected value is input to the drive controller 61.

The control PC 7 is connected to each of the lens controller 6 and the image detector 4. The control PC 7 is provided with a lens console 71 for manipulating settings or the like on the lens controller 6, an image processor 72 that imports the detected image Im from the image detector 4 and processes the detected image Im, and an operation interface 73 that receives operations by a user intended for the variable focal length lens apparatus 1. The lens console 71 includes a resonance lock console 711 for switching the resonance lock controller 612 of the drive controller 61 between enabled and disabled.

(Initial Settings)

Figure 6:
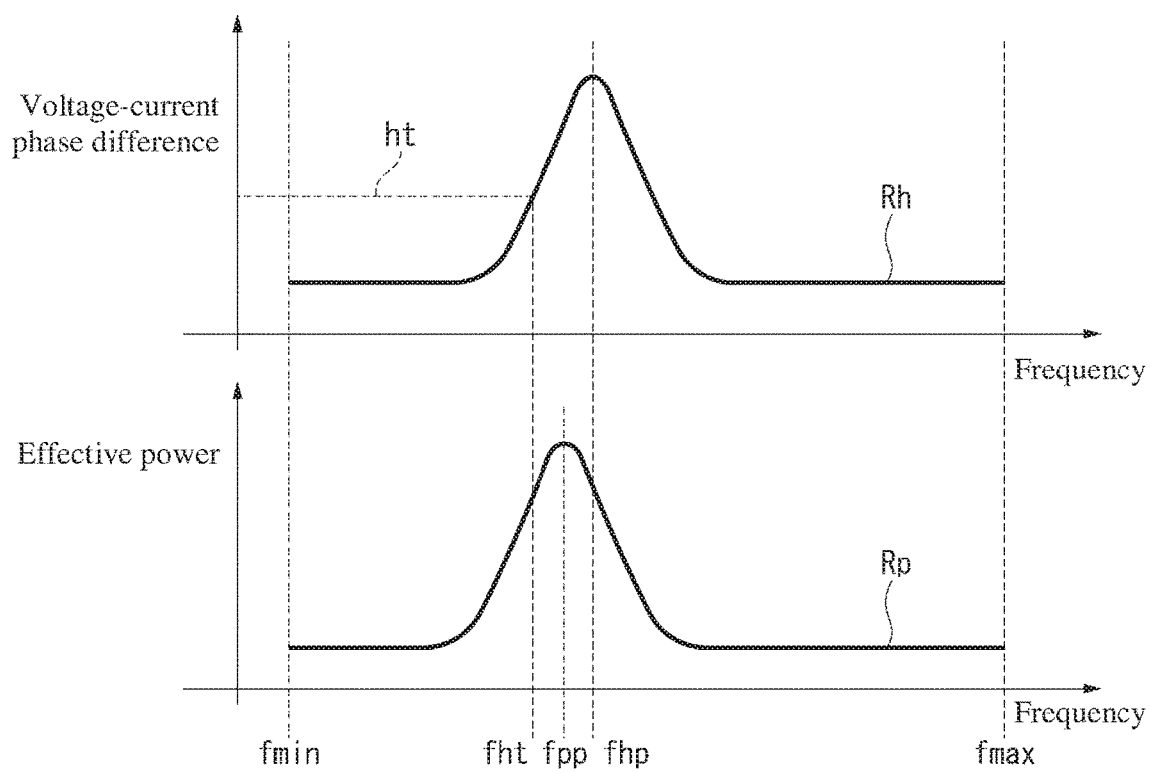
FIG. 6 provides graphs summarizing initial settings in the first embodiment.

Next, the initial settings in the variable focal length lens apparatus 1 are described. First, the initial settings definer 611 performs a voltage-current phase difference Rh peak scan. As illustrated in FIG. 6, in the peak scan, the drive signal Cf is applied to the liquid lens apparatus 3, and also the drive frequency steadily increases from a predetermined lower limit value fmin to an upper limit value fmax, and the voltage-current phase difference Rh in the liquid lens apparatus 3 for each frequency is recorded.

The voltage-current phase difference Rh can be obtained from a voltage waveform of the drive signal Cf and a waveform of the drive current that is detected from the liquid lens apparatus 3.

Next, for the voltage-current phase difference Rh that is detected from the liquid lens apparatus 3, the initial settings definer 611 defines a predetermined value that is lower than the peak value hp as the target voltage-current phase difference ht. Then, two frequencies are detected at which the voltage-current phase difference Rh is equal to the target voltage-current phase difference ht, and one of the two frequencies (in the present embodiment, the lower frequency fht) is defined as the drive frequency. In other words, in the present embodiment, of the two frequencies at which the voltage-current phase difference Rh is equal to the target voltage-current phase difference ht, the lower frequency fht is treated as the resonance frequency of the liquid lens apparatus 3.

In this example, the target voltage-current phase difference ht can be defined as a value having a predetermined ratio (for example, 70%) relative to the peak value hp of the voltage-current phase difference Rh. Alternatively, the target voltage-current phase difference ht may be defined as a value that is smaller than the peak value hp of the voltage-current phase difference Rh by a predetermined value. Also, of the two frequencies where the voltage-current phase difference Rh is equal to the target voltage-current phase difference ht, the higher frequency may be defined as the drive frequency.

FIG. 6 illustrates the voltage-current phase difference Rh, as well as an effective power Rp provided to the liquid lens apparatus 3 during the peak scan. The effective power Rp is calculated by the following Equation (1), where an effective value of the drive voltage is designated Ve, an effective value of the drive current is designated Ie, and the voltage-current phase difference Rh is designated 4.

$$Rp = Ve \cdot Ie \cdot \cos \phi \qquad \text{Equation (1)}$$

As illustrated in FIG. 6, during the peak scan, the effective power Rp provided to the liquid lens apparatus 3 exhibits a peak at a frequency fpp that is slightly lower than the peak frequency fhp of the voltage-current phase difference Rh, and at the frequency fht defined as the drive frequency, the effective power Rp reaches a value that is close to the peak of the effective power Rp.

The initial settings definer 611 defines a desired target effective power pt (see FIG. 10) for the effective power Rp that is provided to the liquid lens apparatus 3. For example, the target effective power pt may be a value that is calculated from the maximum refractive power of the liquid lens apparatus 3 desired by the user.

(Resonance Lock Controller)

After defining the initial settings, the drive controller 61 supplies the drive signal Cf to the liquid lens apparatus 3 based on the defined drive frequency and target effective power pt. In doing so, a standing wave is formed in the liquid lens apparatus 3 and the liquid lens apparatus 3 enters a work state. After the liquid lens apparatus 3 begins working, the resonance lock controller 612 begins resonance lock control. The resonance lock controller 612 according to the present embodiment adjusts the drive frequency so as to stabilize the voltage-current phase difference Rh at a predetermined value (the target voltage-current phase difference ht), and by doing so performs a "phase difference/fixed resonance frequency tracking" type of control in which the drive frequency is tracked to the resonance frequency of the liquid lens apparatus 3.

Figure 7:
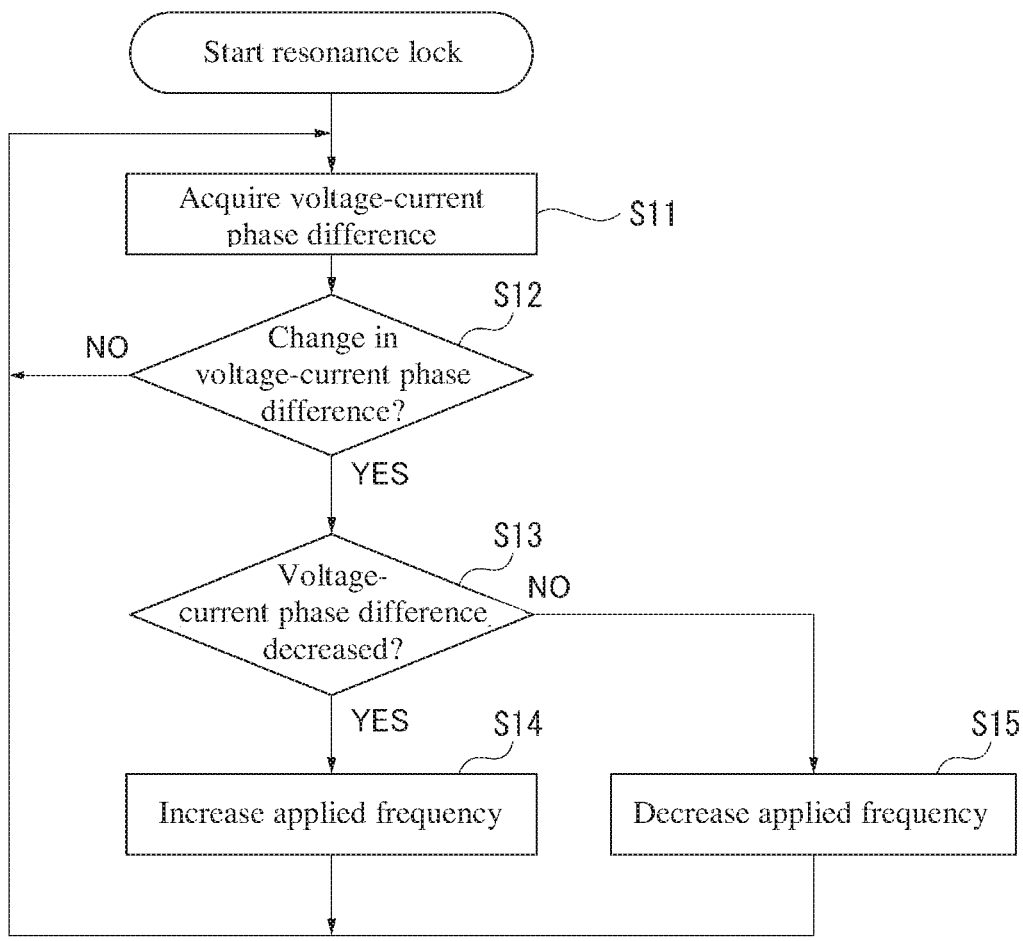
FIG. 7 is a flow chart illustrating a procedural flow of resonance lock control according to the first embodiment.

Specifically, the resonance lock controller 612 performs the resonance lock control illustrated in FIG. 7. In FIG. 7, the resonance lock controller 612 acquires the voltage-current phase difference Rh on a predetermined cycle (process S11) and monitors changes (rises and falls) in the voltage-current phase difference Rh relative to the target voltage-current phase difference ht (process S12). When there is no change in the voltage-current phase difference Rh, this is treated as having no fluctuations in the resonance frequency of the liquid lens apparatus 3, and the monitoring of processes S11 and S12 continues.

Meanwhile, when there is a change in the voltage-current phase difference Rh, this is treated as a fluctuation occurring in the resonance frequency of the liquid lens apparatus 3, and the resonance lock controller 612 determines a direction of the change (rise or fall) in the voltage-current phase difference Rh (process S13). When the voltage-current phase difference Rh has fallen, the drive frequency is raised from the frequency fht (process S14), and when the voltage-current phase difference Rh has risen, the drive frequency is lowered from the frequency fht (process S15). Specifically, the resonance lock controller 612 calculates an amount of frequency change that corresponds to a difference between a present value of the voltage-current phase difference Rh and the target voltage-current phase difference ht. A frequency that reflects the amount of frequency change in the present frequency is then newly defined (updated) as the drive frequency.

Figure 8:
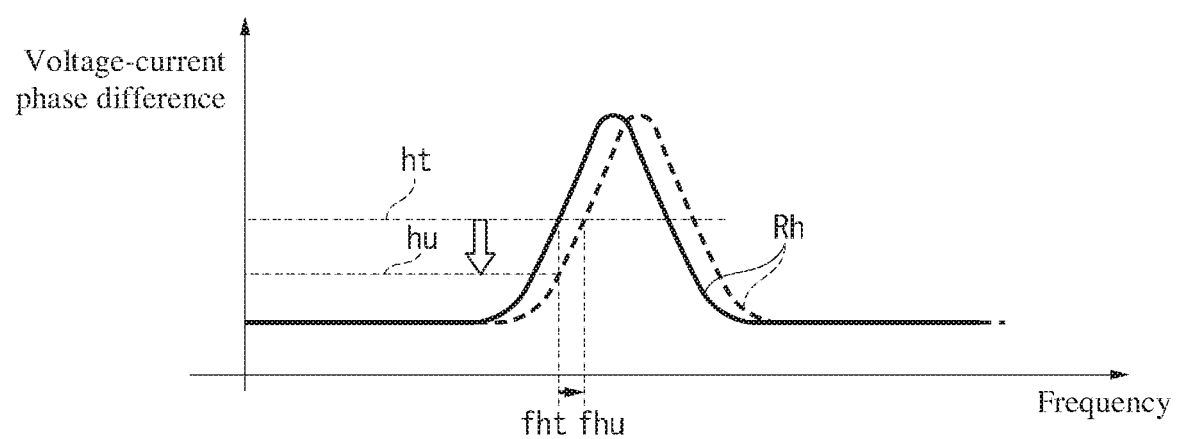
FIG. 8 provides a graph illustrating operations of the resonance lock control according to the first embodiment.

For example, in FIG. 8, when the resonance frequency of the liquid lens apparatus 3 rises from the frequency fht to a frequency fhu due to an increase in temperature or the like, the waveform of the voltage-current phase difference Rh moves to the right in FIG. 8 from a solid line in the figure and assumes a state illustrated by a dashed line. At this point, the voltage-current phase difference Rh acquired by the resonance lock controller 612 decreases from the target voltage-current phase difference ht to a value hu. In such a case, in the process S13 described above, the resonance lock controller 612 determines that the voltage-current phase difference Rh is reduced and, through the process S14 described above, raises the drive frequency from the frequency fht to fhu. Accordingly, the voltage-current phase difference Rh that has fallen to the value hu can be raised to the target voltage-current phase difference ht.

Meanwhile, conversely to the scenario illustrated in FIG. 8, when the resonance frequency of the liquid lens apparatus 3 drops from the frequency fht, the waveform of the voltage-current phase difference Rh moves to the left in FIG. 8 from the solid line in the figure, and the value of the voltage-current phase difference Rh acquired by the resonance lock controller 612 rises. In such a case, in the process S13 described above, the resonance lock controller 612 determines that the voltage-current phase difference Rh is elevated and, through the process S15 described above, lowers the drive frequency from the frequency fit.

Accordingly, the voltage-current phase difference Rh that has risen can be lowered to the target voltage-current phase difference ht.

In the processes given above, when the resonance frequency of the liquid lens apparatus 3 rises, the drive frequency is elevated, and when the resonance frequency of the liquid lens apparatus 3 falls, the drive frequency is lowered.

According to these processes, the drive frequency can be made to track with the resonance frequency of the liquid lens apparatus 3.

(Refractive Power Control)

Figure 9:
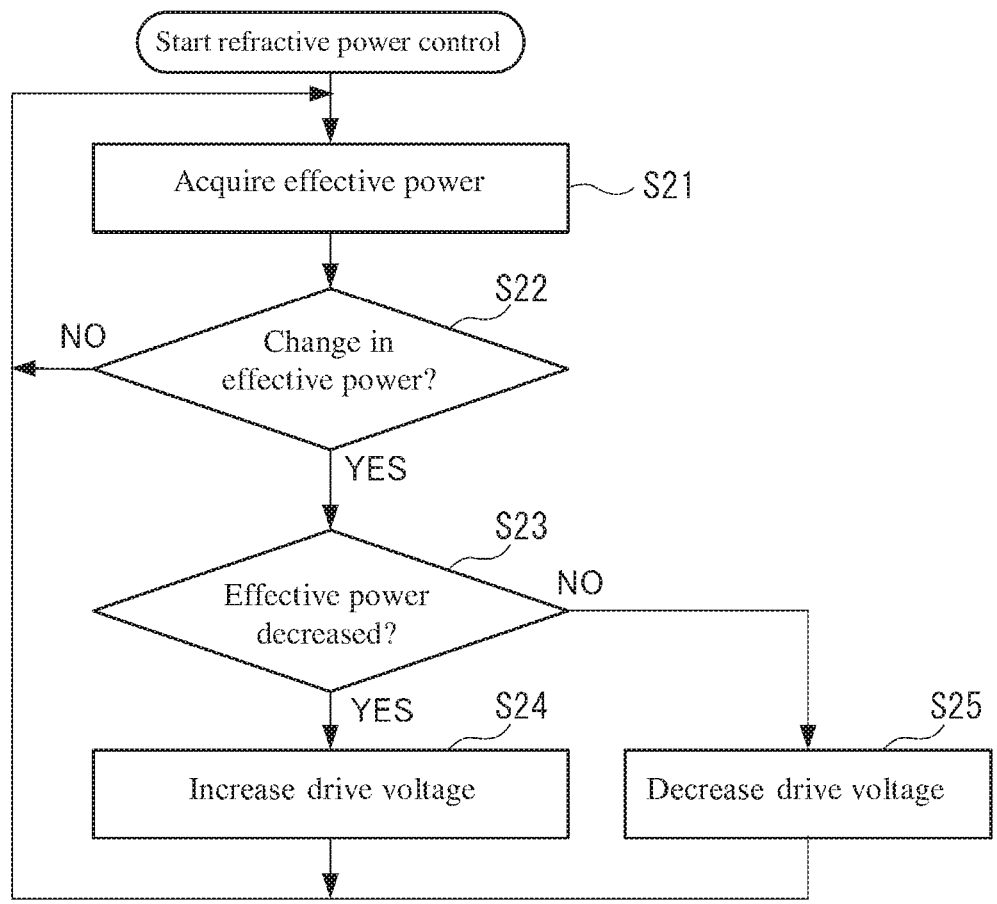
FIG. 9 is a flow chart illustrating a procedural flow of refractive power control according to the first embodiment.

After the liquid lens apparatus 3 begins working, the refractive power controller 613 begins the refractive power control illustrated in FIG. 9. In the present embodiment, whereas the resonance lock control described above is performed every 1 ms, the refractive power control is performed every 200 ms.

In FIG. 9, the refractive power controller 613 acquires the effective power Rp on a predetermined cycle (process S21) and monitors changes (increases and decreases) in the effective power Rp (process S22). When there is no change in the effective power Rp, this is treated as having no fluctuations in the resonance frequency of the liquid lens apparatus 3, and the monitoring of processes S21 and S22 continues.

Meanwhile, when there is a change in the effective power Rp, this is treated as a fluctuation occurring in the resonance frequency of the liquid lens apparatus 3, and the refractive power controller 613 determines a direction of the change (increase or decrease) in the effective power Rp (process S23). When the effective power Rp has decreased, the drive voltage is increased above a present value (process S24), and when the effective power Rp has increased, the drive voltage is decreased below the present value (process S25). Specifically, the refractive power controller 613 calculates an amount of voltage change that corresponds to a difference between the present value of the effective power Rp and the target effective power pt. A voltage value obtained by adding the amount of voltage change to the present value is then newly defined (updated) as the drive voltage.

Figure 10:
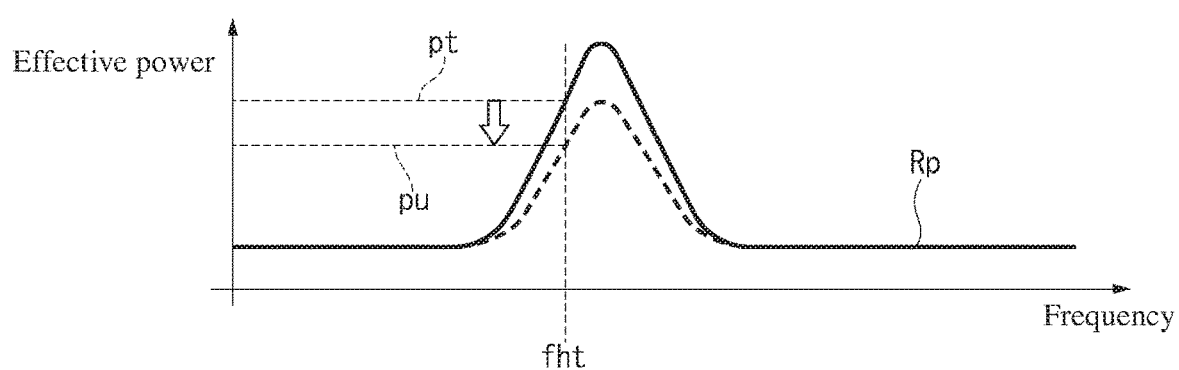
FIG. 10 provides a graph illustrating operations of the refractive power control according to the first embodiment.

For example, in FIG. 10, when the maximum refractive power of the liquid lens apparatus 3 decreases due to a change in temperature inside the liquid lens apparatus 3 or the like, a peak in a waveform of the effective power Rp shifts downward from a solid line in the figure, as illustrated by a dotted line. At this point, the effective power Rp supplied to the liquid lens apparatus 3 decreases from the target effective power pt to pu. In such a case, in the process S23 described above, the refractive power controller 613 determines that the effective power Rp is decreased and, through the process S24 described above, increases the drive voltage. Accordingly, the effective power Rp that has decreased to the value pu can be increased to the target effective power pt.

Meanwhile, conversely to the scenario illustrated in FIG. 10, when the maximum refractive power of the liquid lens apparatus 3 increases, the peak in the waveform of the effective power Rp shifts upward. In such a case, in the process S23 described above, the refractive power controller 613 determines that the effective power Rp is increased and, through the process S25 described above, decreases the drive voltage. Accordingly, the effective power Rp that has increased can be decreased to the target effective power pt.

In the processes given above, when the effective power Rp of the liquid lens apparatus 3 decreases, the drive voltage is increased, and when the effective power Rp of the liquid lens apparatus 3 increases, the drive voltage is decreased. According to these processes, the effective power Rp of the liquid lens apparatus 3 can be adjusted to be constant. As a result, the maximum refractive power of the liquid lens apparatus 3 can be stabilized.

(Effects of the First Embodiment)

In the variable focal length lens apparatus 1 according to the present embodiment, the refractive power controller 613 adjusts the drive voltage in response to the present effective power Rp of the liquid lens apparatus 3, and can thereby supply the desired effective power Rp to the liquid lens apparatus 3. As a result, the maximum refractive power of the liquid lens apparatus 3 can be controlled to a desired value.

Also, in the present embodiment, the refractive power controller 613 increases or decreases the drive voltage based on an increase or decrease in the effective power Rp relative to the target effective power pt. Therefore, the drive voltage can be adjusted such that the effective power Rp stays at the target effective power pt and, thereby, the maximum refractive power of the liquid lens apparatus 3 can be stabilized. In other words, a variable focal range of the variable focal length lens apparatus 1 can be stabilized.

In the present embodiment, the resonance lock controller 612 controls the drive frequency, and the refractive power controller 613 controls the drive voltage. Also, the refractive power controller 613 calculates the effective power Rp based on the drive current Ri, the drive voltage, and the voltage-current phase difference Rh acquired from the resonance lock controller 612. As a result, a stable standing wave can be generated in the liquid lens apparatus 3 while favorably controlling the maximum refractive power of the liquid lens apparatus 3.

In the present embodiment, the resonance lock controller 612 adjusts the drive frequency so as to stabilize the voltage-current phase difference Rh at the target voltage-current phase difference ht, and accordingly performs control in which the drive frequency is tracked to the resonance frequency of the liquid lens apparatus 3. In such a configuration, since the resonance lock controller 612 and the refractive power controller 613 have mutually distinct control objects and reference objects, independent control can be performed at timing that is favorable for each. For example, a time period where the resonance lock controller 612 performs resonance lock control may also overlap with a time period where the refractive power controller 613 performs refractive power control.

Moreover, the following effects are achieved in the present embodiment, in contrast with a second embodiment described below. Specifically, since the resonance lock controller 612 and the refractive power controller 613 have mutually distinct control objects and reference objects, the second embodiment requires a standby time for the resonance lock controller 612, but the present embodiment does not require this. Therefore, resonance lock control can be performed continuously and stably.

Second Embodiment

Figure 11:
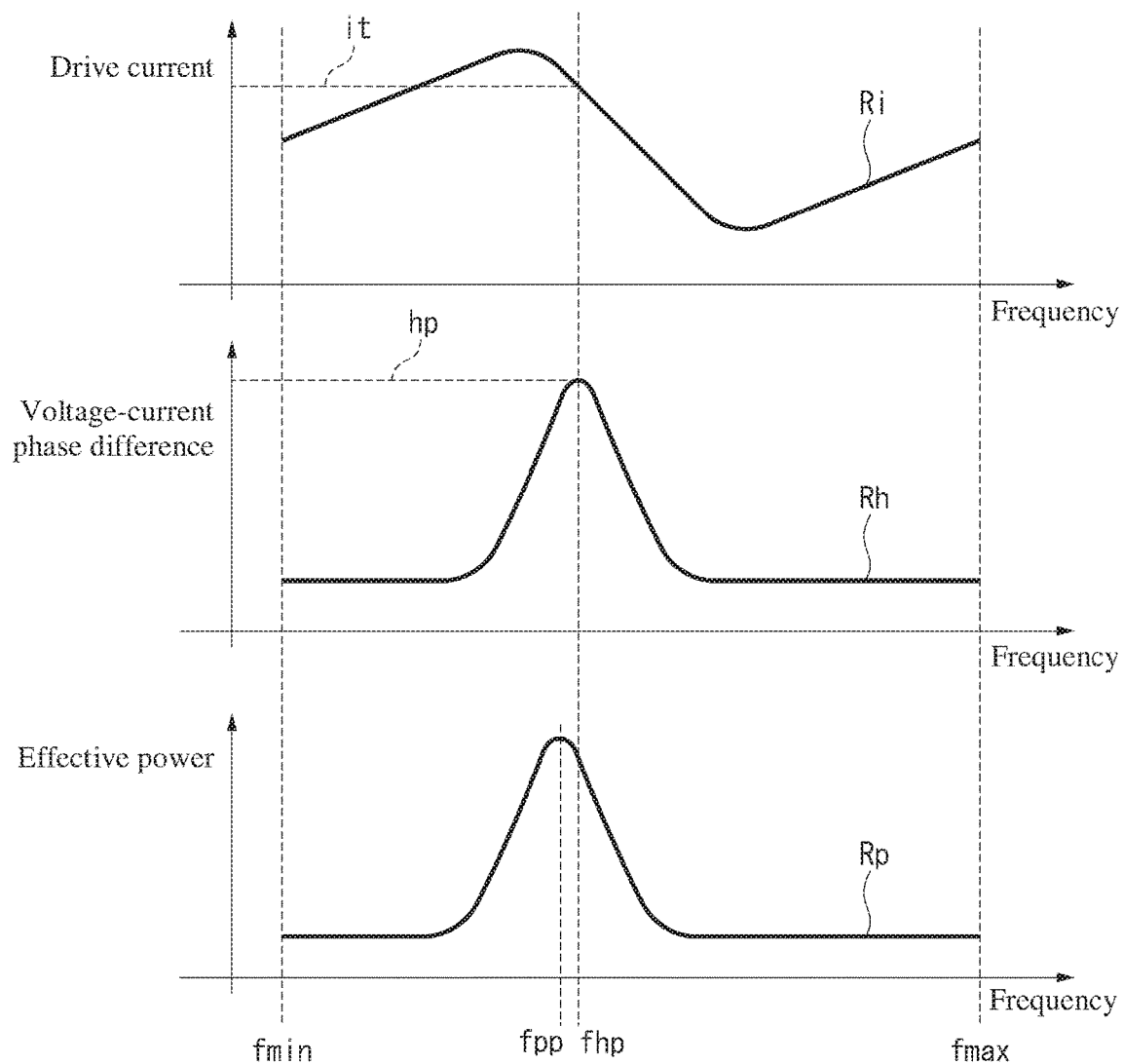
FIG. 11 provides graphs summarizing initial settings in a second embodiment according to the present invention.
Figure 12:
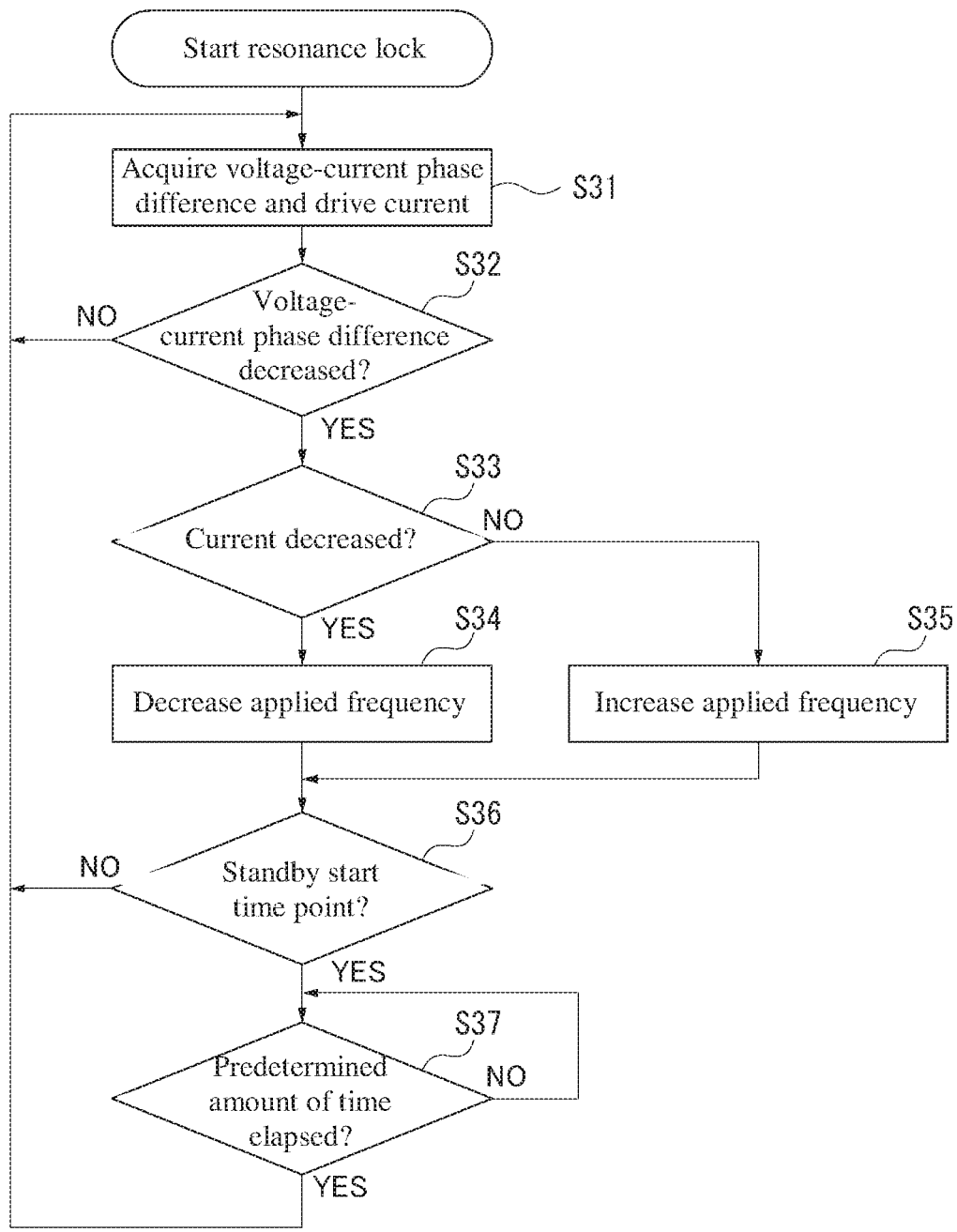
FIG. 12 is a flow chart illustrating a procedural flow of resonance lock control according to the second embodiment.
Figure 13:
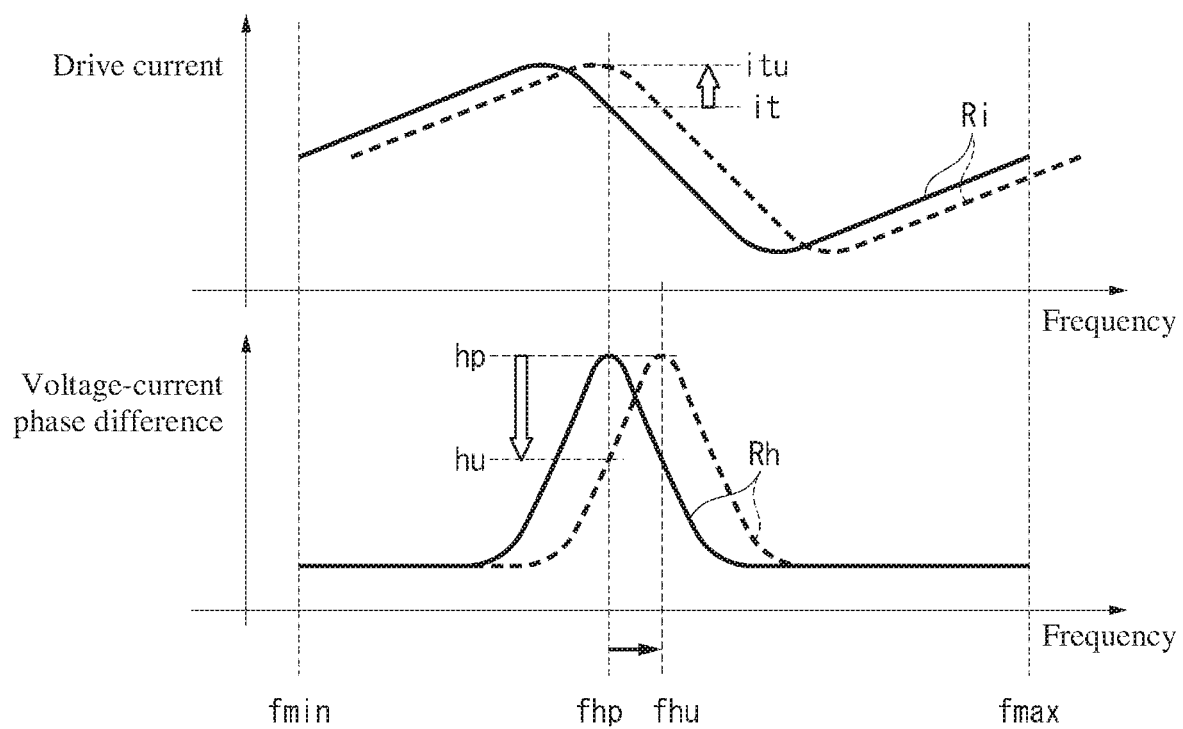
FIG. 13 provides graphs illustrating operations of the resonance lock control according to the second embodiment.

FIGS. 11 to 13 illustrate the second embodiment according to the present invention. In the second embodiment, configurations are identical to those previously described for the variable focal length lens apparatus 1 according to the first embodiment, and the primary difference is a method of resonance lock control. In the following, descriptions of configurations that are similar to the first embodiment are omitted and the content of the control that differs from the first embodiment is described.

(Initial Settings)

The initial settings in the variable focal length lens apparatus 1 are described. As illustrated in FIG. 11 and similar to the first embodiment, the initial settings definer 611 performs a voltage-current phase difference Rh peak scan. FIG. 11 illustrates the voltage-current phase difference Rh, as well as the effective power Rp and the drive current Ri detected from the liquid lens apparatus 3 during the peak scan.

Next, for the voltage-current phase difference Rh that is detected from the liquid lens apparatus 3, the initial settings definer 611 detects the frequency fhp at which the voltage-current phase difference Rh exhibits the peak value hp, and defines that frequency fhp as the drive frequency. In other words, in the second embodiment, the frequency fhp at which the voltage-current phase difference Rh is equal to the peak value hp is treated as the resonance frequency of the liquid lens apparatus 3.

In addition, at the frequency fhp that is defined as the drive frequency, the initial settings definer 611 defines the drive current Ri that is detected from the liquid lens apparatus 3 as a reference drive current it. Also, similarly to the first embodiment, the initial settings definer 611 defines the desired target effective power pt (see FIG. 15) for the effective power Rp that is provided to the liquid lens apparatus 3.

(Resonance Lock Controller)

After the liquid lens apparatus 3 begins working, the resonance lock controller 612 begins resonance lock control. The resonance lock controller 612 according to the present embodiment references the drive current Ri and adjusts the drive frequency so as to stabilize the voltage-current phase difference Rh at the peak value hp, and accordingly performs a "phase difference/peak resonance frequency tracking" type of control in which the drive frequency is tracked to the resonance frequency of the liquid lens apparatus 3.

Specifically, the resonance lock controller 612 performs the resonance lock control illustrated in FIG. 12. In FIG. 12, the resonance lock controller 612 acquires the voltage-current phase difference Rh and the drive current Ri on a predetermined cycle (process S31), and monitors falls in the voltage-current phase difference Rh (process S32). When there is no fall in the voltage-current phase difference Rh, this is treated as having no fluctuations in the resonance frequency of the liquid lens apparatus 3, and the monitoring of processes S31 and S32 continues.

Meanwhile, when there is a fall in the voltage-current phase difference Rh, this is treated as a fluctuation occurring in the resonance frequency of the liquid lens apparatus 3, and a determination is made as to whether the drive current Ri that is detected from the liquid lens apparatus 3 has decreased (process S33). When the drive current Ri has decreased, the drive frequency is lowered from the frequency fhp (process S34), and when the drive current Ri has increased, the drive frequency is raised from the frequency fhp (process S35). Specifically, the resonance lock controller 612 calculates an amount of frequency change that corresponds to a difference between the present value of the drive current Ri and the reference drive current it. A frequency that reflects the amount of frequency change in the present frequency is then newly defined (updated) as the drive frequency.

For example, in FIG. 13, when the resonance frequency of the liquid lens apparatus 3 rises from the frequency fhp to the frequency fhu due to an increase in temperature or the like, the waveform of the voltage-current phase difference Rh moves to the right of the figure and assumes a state illustrated by a dashed line. At this point, the value of the voltage-current phase difference Rh acquired by the resonance lock controller 612 decreases to a value hu that is lower than the peak value hp. Accordingly, in the process S32 described above, the voltage-current phase difference Rh is determined to fall.

Also, in FIG. 13, when the resonance frequency of the liquid lens apparatus 3 increases from the frequency fhp to the frequency fhu, the waveform of the drive current Ri moves to the right of the figure and assumes a state illustrated by a dashed line. At this point, the value of the drive current Ri acquired by the resonance lock controller 612 increases to a value itu that is larger than the reference drive current it. Thus, the drive current Ri is determined to increase in the process S33 described above, and the drive frequency is raised from the frequency fhp to the frequency fhu in the process S35. Accordingly, the drive current Ri that has increased to the value itu can be lowered to the reference drive current it.

Meanwhile, conversely to the case illustrated in FIG. 13, when the resonance frequency of the liquid lens apparatus 3 falls below the frequency fhp, the drive current Ri is in a section sloping downward to the right in the vicinity of the frequency fhp, and therefore the value of the drive current Ri drops. Thus, the drive current Ri is determined to fall in the process S33 described above, and the drive frequency is lowered from the frequency fhp in the process S34. Accordingly, the decreased drive current Ri can be increased to the reference drive current it.

Even with the processes given above, similarly to the first embodiment, when the resonance frequency of the liquid lens apparatus 3 rises, the drive frequency is elevated, and when the resonance frequency of the liquid lens apparatus 3 drops, the drive frequency is lowered. According to these processes, the drive frequency can be made to track with the resonance frequency of the liquid lens apparatus 3.

In addition, in the second embodiment, after the process S34 or the process S35, the procedure moves to a process S36. In the process S36, a judgment is made as to whether or not the process is presently at a standby start time point, based on a number of loops of the processes S31 to S35, an amount of time elapsed since starting the liquid lens apparatus 3, or the like (process S36). In the case of a "YES," the procedure moves to a process S37, and in the case of a "NO," the procedure returns to the process S31 and repeats another loop.

In the process S37, a determination is made as to whether a predetermined amount of standby time has elapsed. In the case of a "YES," the procedure returns to the process S31 and repeats another loop, and in the case of a "NO," the procedure stands by until reaching a determination of "YES." During the standby time of the resonance lock controller 612, refractive power control by the refractive power controller 613 is performed as described below.

(Refractive Power Control)

After the liquid lens apparatus 3 begins working, the refractive power controller 613 performs refractive power control of the liquid lens apparatus 3. The specific content of the process performed by the refractive power controller 613 is largely similar to the content described in the first embodiment.

Figure 14:
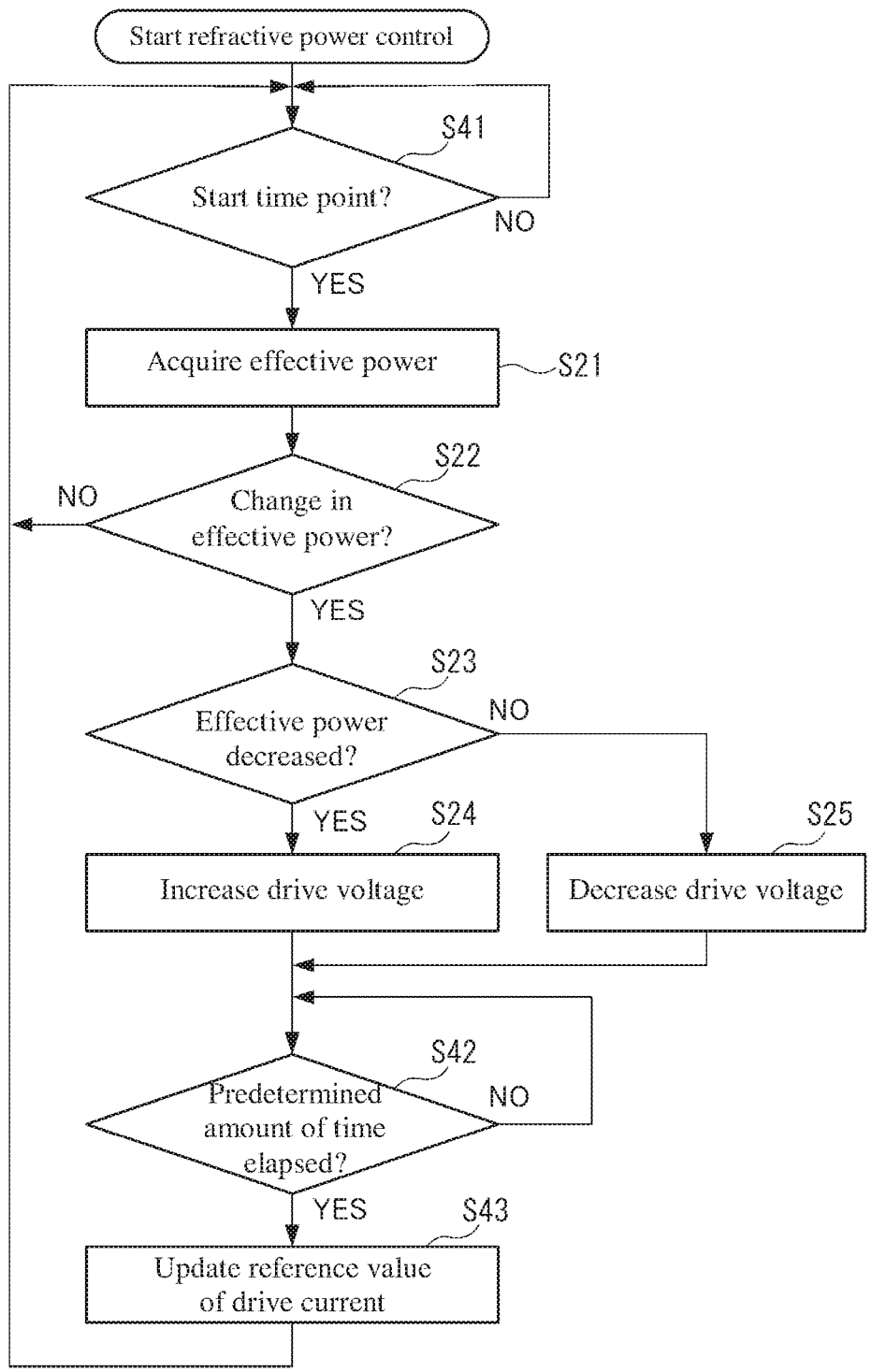
FIG. 14 is a flow chart illustrating a procedural flow of refractive power control according to the second embodiment.

However, in the second embodiment, when the drive voltage is modified due to refractive power control by the refractive power controller 613, the drive current Ri that the resonance lock controller 612 references in order to perform resonance lock control may change. Given this, as illustrated in FIG. 14, in addition to the processes S21 to S25 according to the first embodiment, processes S41 to S43 are performed in the second embodiment.

Specifically, after the liquid lens apparatus 3 begins working, the refractive power controller 613 first determines whether or not the process is presently at a start time point for the refractive power control (process S41). In this example, the start time point for the refractive power control can, for example, be determined based on whether a predetermined first amount of pause time has elapsed since the resonance lock controller 612 began standby. In the case of a "YES" in the process S41, the procedure advances to the process S21, and in the case of a "NO," the procedure stands by until reaching a determination of "YES."

After this, the refractive power controller 613 executes the procedure from the process S21 through the process S24 or the process S25, similar to the first embodiment. For example, in FIG. 15, when the maximum refractive power of the liquid lens apparatus 3 decreases, the peak in the waveform of the effective power Rp shifts downward from a solid line in the figure, as illustrated by a dotted line. At this point, the effective power Rp supplied to the liquid lens apparatus 3 decreases from the target effective power pt to pu. In such a case, the refractive power controller 613 determines that the effective power Rp is decreased (process S23), and increases the drive voltage (process S24). Accordingly, the effective power Rp that has decreased can be increased to the target effective power pt.

Figure 15:
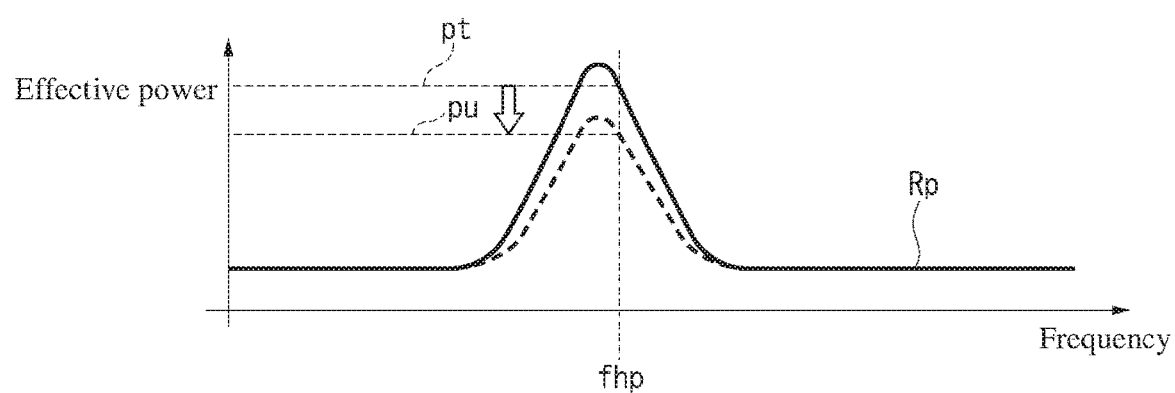
FIG. 15 provides a graph illustrating operations of the refractive power control according to the second embodiment.

Meanwhile, conversely to the scenario illustrated in FIG. 15, when the maximum refractive power of the liquid lens apparatus 3 increases, the peak in the waveform of the effective power Rp shifts upward. In such a case, the refractive power controller 613 determines that the effective power Rp is increased (process S23), and decreases the drive voltage (process S25). Accordingly, the effective power Rp that has increased can be decreased to the target effective power pt.

After this, in the process S42, a determination is made as to whether a predetermined amount of time (second amount of pause time) has elapsed since the process S24 or the process S25. In the case of a "YES" in the process S42, the procedure advances to the process S43, and in the case of a "NO," the procedure stands by until reaching a determination of "YES."

The first and second amounts of pause time in the processes S41 and S42, respectively, are amounts of time that pass until circuit conditions of the lens controller 6 or the oscillation state of the liquid lens apparatus 3, for example, stabilize after being influenced by the adjustment of the drive frequency or the drive voltage. These amounts of time can be defined as desired.

In the process S43, the refractive power controller 613 updates the reference drive current it of the drive current Ri, which is used in the resonance lock control, to the present value. Accordingly, a change in the drive current Ri associated with modification of the drive voltage can be inhibited from having an influence. After the process S43, the procedure returns to the process S41 and stands by until the next start time point.

According to the above processes, similar to the first embodiment, the drive voltage can be increased and decreased so that the effective power Rp of the liquid lens apparatus 3 is constant, and the maximum refractive power of the liquid lens apparatus 3 can be stabilized.

(Relationship Between Resonance Lock Control and Refractive Power Control)

Figure 16:
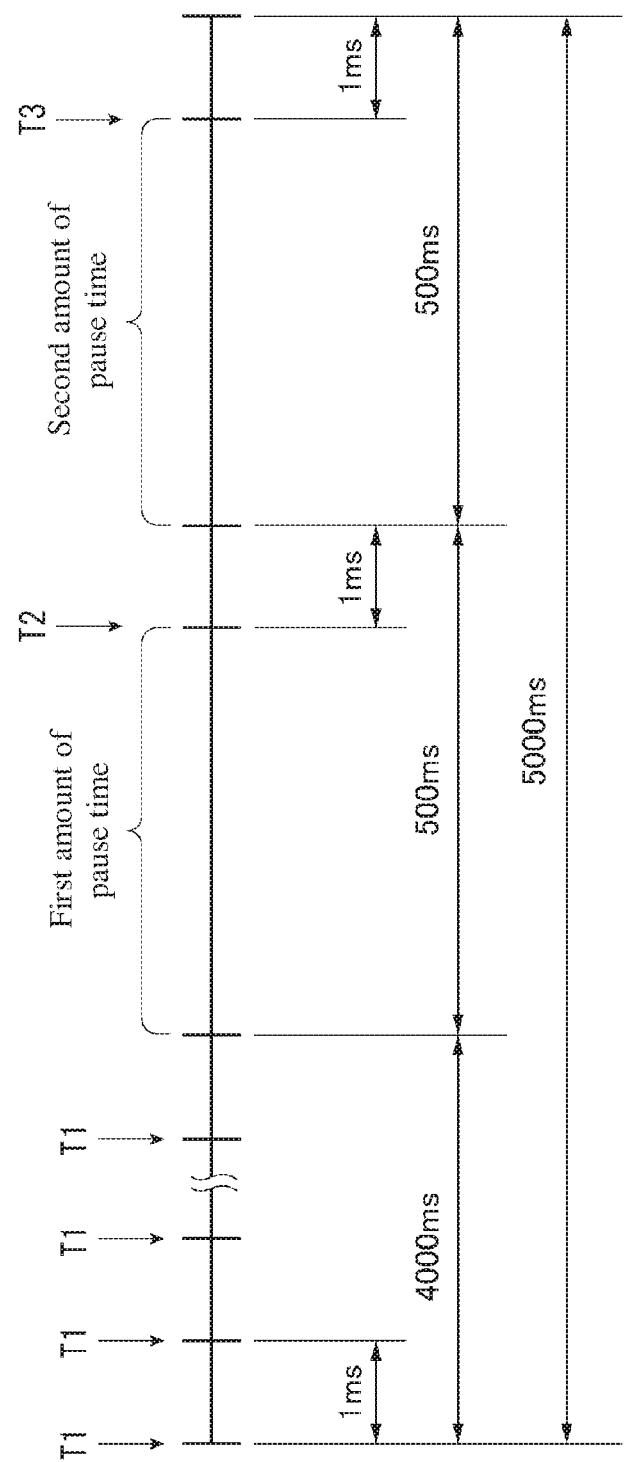
FIG. 16 is a time chart illustrating the timing of each operation of the resonance lock control and the refractive power control according to the first embodiment.

A time chart in FIG. 16 illustrates exemplary operations of the resonance lock controller 612 and the refractive power controller 613. In FIG. 16, the timing at which the process S31 in the resonance lock control is performed (at which the voltage-current phase difference Rh and the drive current Ri are acquired) is illustrated as T1, the timing at which the process S21 is performed in the refractive power control (at which the effective power Rp is acquired) is illustrated as T2, and the timing at which the process S43 is performed in the refractive power control (at which the reference drive current it of the drive current Ri is updated) is illustrated as T3.

As illustrated in FIG. 16, out of 5000 ms, during an earlier segment of 4000 ms, the resonance lock controller 612 starts resonance lock control at the timing T1, which occurs every 1 ms, and during the latter segment of 1000 ms, the resonance lock controller 612 is in a standby state. On the other hand, the refractive power controller 613 begins stabilization control of the effective power Rp at the timing T2, where the first amount of pause time (a little under 500 ms, approximately) from the start of standby of the resonance lock controller 612 has elapsed. After this, the refractive power controller 613 starts an update process of the reference drive current it at the timing T3, where the second amount of pause time (a little under 500 ms, approximately) has elapsed.

With exemplary operations such as these, the resonance lock controller 612 is in the standby state while the refractive power controller 613 increases and decreases the drive voltage, thereby circumventing fluctuation of the reference object during control operations of the resonance lock controller 612. Accordingly, the influence of the refractive power controller 613 on the resonance lock controller 612 can be decreased.

With exemplary operations such as these, there is a chance that the resonance frequency may change during the standby time of the resonance lock controller 612. Therefore, there is a possibility that an offset may arise between the actual resonance frequency and drive frequency, and the updated value of the reference drive current it may be different from the actual drive current at the resonance frequency. In view of this, in order to keep the resonance lock control stable, preferably, a peak scan similar to that performed for the initial settings is periodically performed and any offset between the resonance frequency and the drive frequency is eliminated.

Other Embodiments

The present invention is not limited to the above-described embodiments, and includes modifications within a scope capable of achieving the advantages of the present invention.

The various controls according to the first and second embodiments can be combined. For example, the cycle at which refractive power control is performed can be made shorter in the first embodiment than in the second embodiment. Accordingly, when a change in temperature of the liquid lens apparatus 3 is less than a predetermined value, the resonance lock control and refractive power control according to the second embodiment are performed, and when a change in temperature of the liquid lens apparatus 3 is equal to or greater than the predetermined value, the resonance lock control and refractive power control according to the first embodiment are performed.

In each of the embodiments, the refractive power controller 613 adjusts the drive voltage so as to keep the effective power Rp of the liquid lens apparatus 3 at the target effective power pt, but the present invention is not limited to this. For example, the drive voltage may also be adjusted such that the effective power Rp changes, with a view to changing the maximum refractive power of the liquid lens apparatus 3.

In the various embodiments described above, the refractive power control achieved with the refractive power controller 613 is performed together with the resonance lock control achieved with the resonance lock controller 612, but the present invention is not limited to this. Specifically, so long as a stable standing wave can be generated in the liquid lens apparatus 3 through some other method such as temperature control, there is no need to perform resonance lock control with the resonance lock controller 612.

The control method using the resonance lock controller 612 is not limited to the method described in the various embodiments above. For example, the resonance lock controller 612 may also detect the oscillation state Vf of the liquid lens apparatus 3 by way of an oscillation sensor installed in the liquid lens apparatus 3. Also, by referencing the detected oscillation state Vf of the liquid lens apparatus 3, the drive frequency may be tracked to the resonance frequency of the liquid lens apparatus 3.

In the various embodiments described above, a combination of the lens controller 6 and the control PC 7 is used to drive and control the liquid lens apparatus 3, but these components may be configured as an integrated device that collectively performs drive, control, and operation of the liquid lens apparatus 3. However, as in the various embodiments described above, by combining the lens controller 6 and the control PC 7, hardware needed for driving and controlling the liquid lens apparatus 3 can be provided independently as a dedicated lens control device. Also, lens controller 6 operations, settings adjustment, and even image import can be achieved using a highly versatile personal computer.

In each of the embodiments described above, the drive signal Cf and the focal point fluctuation waveform Mf are configured to be sine waves. However, the drive signal Cf and the focal point fluctuation waveform Mf may instead be triangular waves, saw-tooth waves, rectangular waves, or some other waveform. The specific configuration of the liquid lens apparatus 3 may be modified as appropriate. Instead of having a hollow cylindrical shape, the case 31 and the oscillating member 32 may have a hollow hexagonal shape, for example. The dimensions of these components and the properties of the liquid 35 can also be selected as appropriate for the application.

The present invention can be used in a variable focal length lens apparatus and a variable focal length lens control method.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A variable focal length lens apparatus comprising:
a lens system in which the refractive index changes in accordance with an input drive signal; and
a refractive power controller that controls refractive power of the lens system,
wherein the refractive power controller adjusts a drive voltage, which is the voltage of the drive signal, in accordance with effective power that is supplied to the lens system, the effective power corresponding to a resonance frequency of the lens system.

2. The variable focal length lens apparatus according to claim 1,
wherein the refractive power controller adjusts the drive voltage based on increases and decreases in the effective power relative to a target effective power.

3. A variable focal length lens apparatus comprising:
a lens system in which the refractive index changes in accordance with an input drive signal;
a refractive power controller that
controls refractive power of the lens system,
adjusts a drive voltage, which is the voltage of the drive signal, in accordance with effective power that is supplied to the lens system, and
adjusts the drive voltage based on increases and decreases in the effective power relative to a target effective power; and
a resonance lock controller that detects a drive current supplied to the lens system, the drive voltage, and a voltage-current phase difference, which is a phase difference between the drive current and the drive voltage,
wherein the resonance lock controller causes a frequency of the drive signal to track to a resonance frequency of the lens system based on the drive current or the voltage-current phase difference, and
wherein the refractive power controller calculates the effective power based on the drive current, the drive voltage, and the voltage-current phase difference acquired from the resonance lock controller.

4. The variable focal length lens apparatus according to claim 3,
wherein the resonance lock controller adjusts the frequency of the drive signal based on increases and decreases in the voltage-current phase difference relative to a target voltage-current phase difference.

5. The variable focal length lens apparatus according to claim 3,
wherein the resonance lock controller adjusts the frequency of the drive signal based on increases and decreases in the drive current relative to a reference drive current, and
the resonance lock controller is in a standby state while the refractive power controller increases and decreases the voltage of the drive signal.

6. The variable focal length lens apparatus according to claim 5,
wherein the refractive power controller updates the reference drive current when the voltage of the drive signal has been adjusted.

7. A method of controlling variable focal length lens apparatus having a lens system, the method comprising:
changing a refractive index of the lens system in accordance with an input drive signal;
controlling refractive power of the lens system; and
adjusting the voltage of the drive signal in accordance with effective power that is supplied to the lens system, the effective power corresponding to a resonance frequency of the lens system.

* * * * *